US008125375B2

(12) United States Patent
Nakanishi (10) Patent No.: US 8,125,375 B2
(45) Date of Patent: Feb. 28, 2012

(54) RADAR

(75) Inventor: Motol Nakanishi, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 1100 days.

(21) Appl. No.: 11/934,382

(22) Filed: Nov. 2, 2007

(65) Prior Publication Data

US 2011/0050484 A1    Mar. 3, 2011

(30) Foreign Application Priority Data

May 16, 2005  (JP) ................. 2005-143173

(51) Int. Cl.
*G01S 7/35* (2006.01)
*G01S 7/40* (2006.01)
*G01S 13/34* (2006.01)
*G01S 13/00* (2006.01)
*G01S 13/93* (2006.01)

(52) U.S. Cl. .............. 342/159; 342/70; 342/89; 342/91; 342/118; 342/128; 342/165; 342/173; 342/175; 342/192; 342/195

(58) Field of Classification Search .................. 342/27, 342/28, 70–72, 89–93, 118, 128–133, 159–164, 342/175, 192–197, 200–205, 13–20, 165, 342/173, 174; 102/200, 206, 211, 214
See application file for complete search history.

(56) References Cited

U.S. PATENT DOCUMENTS

| 3,623,097 | A | * | 11/1971 | Femenias | 342/128 |
|---|---|---|---|---|---|
| 3,701,154 | A | * | 10/1972 | McKinney | 342/16 |
| 3,754,254 | A | * | 8/1973 | Jinman | 342/28 |
| 3,906,493 | A | * | 9/1975 | Adrian et al. | 342/91 |
| 4,003,053 | A | * | 1/1977 | Mengel | 342/159 |
| 4,115,774 | A | * | 9/1978 | Tresselt | 342/203 |
| 4,118,701 | A | * | 10/1978 | Fletcher et al. | 342/200 |
| 4,236,157 | A | * | 11/1980 | Goss et al. | 102/214 |
| 4,348,675 | A | * | 9/1982 | Senzaki et al. | 342/71 |
| 4,635,058 | A | * | 1/1987 | Sutphin, Jr. | 342/192 |
| 4,660,042 | A | * | 4/1987 | Ekstrom | 342/175 |
| 5,021,791 | A | * | 6/1991 | Hurd | 342/93 |
| 5,274,380 | A | * | 12/1993 | Yatsuka et al. | 342/70 |
| 5,276,450 | A | * | 1/1994 | Schwegman | 342/16 |
| 5,345,470 | A | * | 9/1994 | Alexander | 342/200 |
| 5,347,283 | A | * | 9/1994 | Krizek et al. | 342/201 |
| 6,121,918 | A | * | 9/2000 | Tullsson | 342/159 |

(Continued)

FOREIGN PATENT DOCUMENTS

DE    10 2004 024 125 A1    1/2005

(Continued)

*Primary Examiner* — Bernarr Gregory (74) *Attorney, Agent, or Firm* — Dickstein Shapiro LLP (57) ABSTRACT

A radar that detects the presence or absence of interference when detecting a target based on a frequency spectrum of a beat signal of a transmission signal and a reception signal. Whether or not the number of peaks exceeding a noise threshold in the frequency spectrum exceeds a predetermined number is determined. According to the determination result, the presence or absence of interference on the beat signal is detected. If "interference exists", the threshold for extraction of target peaks that appear on the frequency spectrum is increased. This allows detection of the presence or absence of a spike noise superposed on the beat signal to be performed more certainly, thereby enabling processing according to the presence or absence of interference.

7 Claims, 8 Drawing Sheets

U.S. PATENT DOCUMENTS

| | | | |
|---|---|---|---|
| 6,191,726 B1 * | 2/2001 | Tullsson | 342/128 |
| 6,429,807 B2 * | 8/2002 | Shiratori et al. | 342/175 |
| 6,445,336 B2 * | 9/2002 | Soshi et al. | 342/70 |
| 6,469,662 B2 * | 10/2002 | Tullsson | 342/195 |
| 6,664,919 B2 * | 12/2003 | Isaji | 342/128 |
| 6,894,641 B2 * | 5/2005 | Uehara et al. | 342/128 |
| 6,924,762 B2 | 8/2005 | Miyake et al. | |
| 7,187,321 B2 * | 3/2007 | Watanabe et al. | 342/128 |
| 7,339,518 B2 * | 3/2008 | Natsume et al. | 342/70 |
| 7,403,153 B2 * | 7/2008 | Kelly et al. | 342/159 |
| 7,432,849 B2 * | 10/2008 | Noda | 342/70 |
| 7,460,058 B2 * | 12/2008 | Nakanishi | 342/128 |
| 7,532,154 B2 * | 5/2009 | Noda | 342/192 |
| 7,612,707 B2 * | 11/2009 | Wise et al. | 342/91 |
| 7,683,827 B2 * | 3/2010 | Kelly et al. | 342/159 |
| 7,791,532 B2 * | 9/2010 | Nakanishi | 342/192 |

FOREIGN PATENT DOCUMENTS

| | | |
|---|---|---|
| JP | 04-204189 | 7/1992 |
| JP | 2002-168947 | 6/2002 |
| JP | 2004-286537 | 10/2004 |
| JP | 2004-333234 | 11/2004 |

* cited by examiner

RADAR

FIELD OF THE INVENTION

The present invention relates to FM-CW (Frequency Modulated-Continuous Wave) radars that detect a target through transmission and reception of electromagnetic beams.

BACKGROUND OF THE INVENTION

Figure 4A:
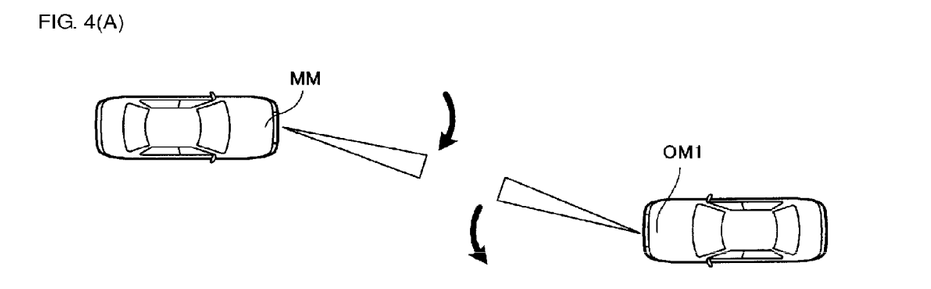
FIGS. 4(A) to 4(C) are diagrams showing examples of various cases causing interference.
Figure 4B:
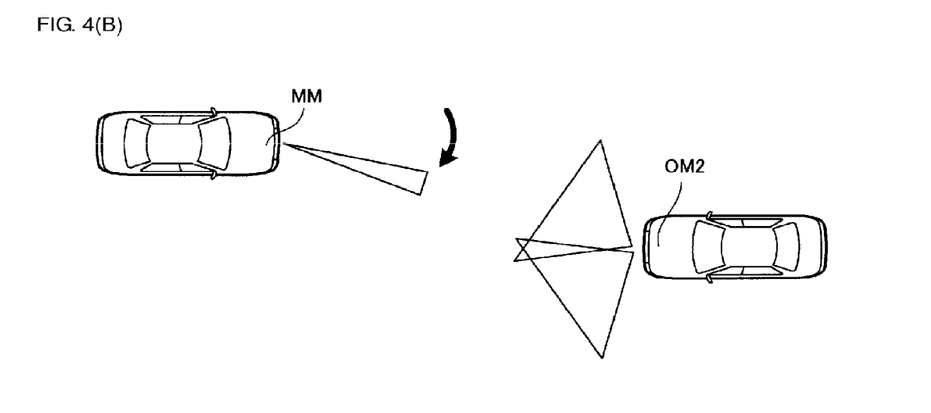
Figure 4C:
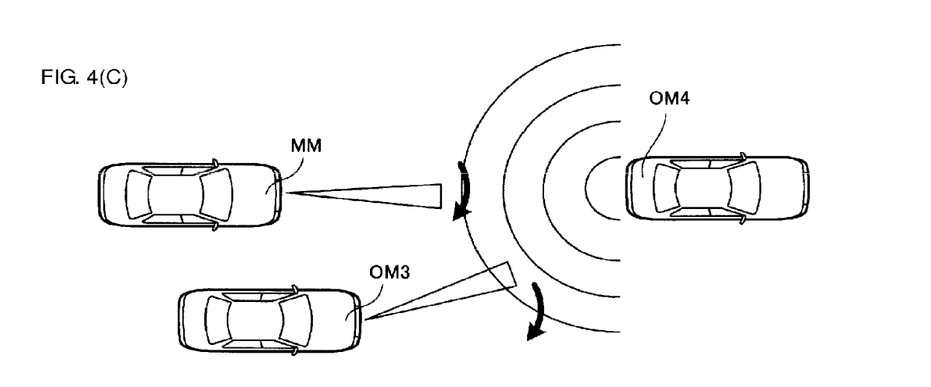

Hitherto, in FM-CW radars, serving as on-vehicle radars, that use a millimeter wave, there has been a problem of interference with radars mounted on other vehicles. More specifically, as shown in FIG. 4(A), when a vehicle MM and another vehicle OM1 on each of which a radar that radiates beams in an azimuth direction is mounted face each other, a spike noise is superposed on (mixed in) a beat signal at the time that the beat is caused between the reception signal and a transmission signal of the vehicle MM after the vehicle MM directly receives a transmission signal from the other vehicle OM1. In addition, as shown in FIG. 4(B), a vehicle MM on which a radar that performs beam scans is mounted and another vehicle OM2 on which a monopulse radar is mounted face each other, a spike noise is superposed on a beat signal of a transmission signal and a reception signal. Furthermore, as shown in FIG. 4(C), when another vehicle OM4 that runs in front of a vehicle MM exists and still another vehicle OM3 that transmits a radio wave to this other vehicle OM4 exists, a signal transmitted from the radar mounted on the other vehicle OM3 and reflected from the other vehicle OM4 is superposed on a reception signal of a radar of an vehicle MM, due to which a spike noise is superposed on a beat signal.

Patent Document 1 discloses a method for performing detection of such a spike noise.

Patent Document 1: Japanese Unexamined Patent Application Publication No. 2002-168947

In a method described in Patent Document 1, when an amplitude level of a reception signal exceeds a predetermined threshold, it is determined that interference exists.

However, there is a problem that the interference cannot be detected except when a spike noise having the amplitude greater than the expected maximum amplitude of a reflected signal (i.e., a reception signal) is mixed in.

In another particular circumstance, Patent Document 1 also describes that, when the frequency of a signal is higher than a predetermined value, the signal is considered as an interference wave. However, high frequency components unnecessary for target detection have only to be excluded from a subject of the target detection, which is not problematic from the beginning.

In addition, in still another particular circumstance, Patent Document 1 describes that, if a correlation between a beat signal determined in the last frame and a beat signal determined in this frame is not obtained in a case where one frame is constituted by an up-modulation interval and a down-modulation interval and the frame is repeated, it is determined that "interference exists". However, when relative speed of a vehicle or another vehicle, namely, a target, is high, the correlation cannot be obtained and it may be mistakenly determined that "interference exists".

SUMMARY OF THE INVENTION

Accordingly, it is an object of the present invention to provide radars that allow processing to be certainly performed according to presence or absence of interference by permitting detection of presence or absence of a spike noise superposed on a beat signal to be performed more certainly.

To solve the above-described problems, radars according to this invention are configured as follows.

A radar, having an electromagnetic wave transmitting and receiving means for transmitting an electromagnetic wave whose frequency gradually changes in a modulation interval over time and for receiving the magnetic wave reflected from a target, means for determining a frequency spectrum of a beat signal of the transmission signal and the reception signal, and means for detecting information of the target on the basis of a peak exceeding a noise threshold among data items constituting the frequency spectrum, is characterized by including means for detecting presence or absence of interference on the beat signal (presence or absence of superposition of a spike noise on the beat signal) according to whether or not the number of peaks exceeding the noise threshold exceeds a predetermined number, and signal processing means for performing processing on the beat signal according to presence or absence of the interference.

A radar is characterized by including means for setting a reference number of the number of peaks exceeding the noise threshold, means for detecting presence or absence of interference on the beat signal (presence or absence of superposition of a spike noise on the beat signal) according to whether or not the number of peaks exceeding the noise threshold exceeds the reference number by a predetermined value or a predetermined ratio, and signal processing means for performing processing on the beat signal according to presence or absence of the interference.

The electromagnetic wave transmitting and receiving means repeats scans of electromagnetic beams in the azimuth direction. The reference number is set on the basis of the number of peaks, exceeding the threshold, determined for a beam in the same direction in a previous scan that is different from the last scan.

The electromagnetic wave transmitting and receiving means repeats scans of electromagnetic beams in the azimuth direction. The reference number is set on the basis of the number of peaks, exceeding the threshold, determined for a beam neighboring the focused beam.

The reference number is set on the basis of the number of peaks, exceeding the threshold, determined for a neighboring modulation interval.

Since a spike noise is superposed on a beat signal in a state that interference is caused and a noise floor in a frequency spectrum rises according to the superposition, the number of peaks exceeding a noise threshold significantly increases. Thus, by providing means for detecting presence or absence of interference according to whether or not the number of noise-threshold-exceeding-peaks appearing on the frequency spectrum exceeds a predetermined number, presence or absence of interference can be detected certainly.

By providing means for detecting presence or absence of interference according to whether or not the number of noise-threshold-exceeding-peaks appearing on the frequency spectrum exceeds a reference number by a predetermined value or a predetermined ratio, presence or absence of interference can be detected certainly.

By setting the reference number on the basis of the number of threshold-exceeding-peaks determined for a beam in the same direction in a scan different from the last scan, an appropriate noise threshold based on background noise components in a steady state can be set easily.

By setting the reference number on the basis of the number of threshold-exceeding-peaks determined for a beam neighboring the focused beam, an appropriate noise threshold based on background noise components in a steady state can be set easily.

By setting the reference number on the basis of the number of threshold-exceeding-peaks determined for a neighboring modulation interval, an appropriate noise threshold based on background noise components in a steady state can be set easily.

REFERENCE NUMERALS

17 DSP
ADC AC converter
DAC DA converter
VCO voltage-controlled oscillator

DETAILED DESCRIPTION OF THE INVENTION

A configuration of a radar according to a first embodiment will be described with reference to FIG. 1 to FIG. 8.

Figure 1:
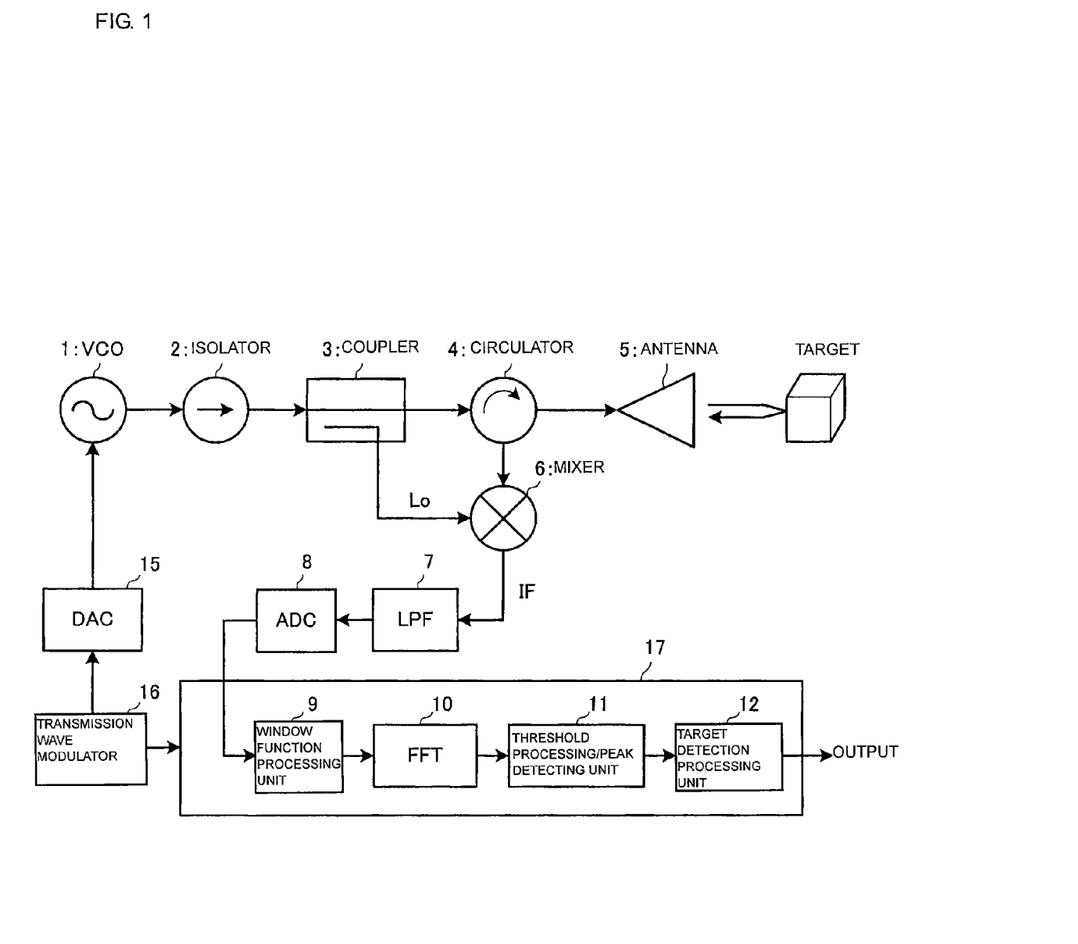
FIG. 1 is a block diagram showing a configuration of the entirety of a radar according to a first embodiment.

FIG. 1 is a block diagram showing a configuration of the entirety of a radar. A transmission wave modulator 16 sequentially outputs digital data of a modulation signal to a DA converter 15. A VCO 1 alters an oscillation frequency according to a control voltage output from the DA converter 15, thereby FM-modulating the oscillation frequency of the VCO 1 to generate a continuous triangular wave. An isolator 2 transmits an oscillation signal from the VCO 1 to a coupler 3 to prevent a reflected signal from coming into the VCO 1. The coupler 3 transmits the signal having been through the isolator 2 to a circulator 4. The coupler 3 also supplies part of the transmission signal to a mixer 6 as a local signal Lo at a predetermined distribution ratio. The circulator 4 transmits the transmission signal to an antenna 5. The circulator 4 also supplies a reception signal from the antenna 5 to the mixer 6. The antenna 5 transmits the FM-modulated continuous wave transmission signal supplied from the VCO 1 and receives the signal reflected from the same direction. In addition, the antenna 5 periodically alters a direction of beams over a predetermined detection angle range to perform a beam scan.

The mixer 6 mixes the local signal Lo from the coupler 3 and the reception signal from the circulator 4, and outputs a beat signal (i.e., an intermediate frequency signal IF). A low pass filter 7 eliminates unnecessary high frequency components of the IF signal. An AD converter 8 converts the signal into a sampling data sequence, and supplies the sampling data sequence to a DSP (digital signal processor) 17.

The DSP 17 temporarily buffers the digital data sequence, which is converted by the AD converter 8, for at least one scan (for a plurality of beam scans within a predetermined detection angle range), and calculates the azimuth, the distance, and the speed of a target through processing described below.

In the DSP 17, a window function processing unit 9 performs weighting (clipping) on the sampling data sequence with a predetermined window function. An FFT computing unit 10 analyzes frequency components by performing FFT calculation on the data items in the sampling interval windowed by the window function.

A threshold processing/peak detecting unit 11 considers peaks exceeding a predetermined noise threshold in a frequency spectrum as target peaks, and extracts frequencies and peak values of those peaks.

A target detection processing unit 12 calculates the distance to the target and the speed of the target on the basis of the peak frequency of the detected target peak.

Figure 2:
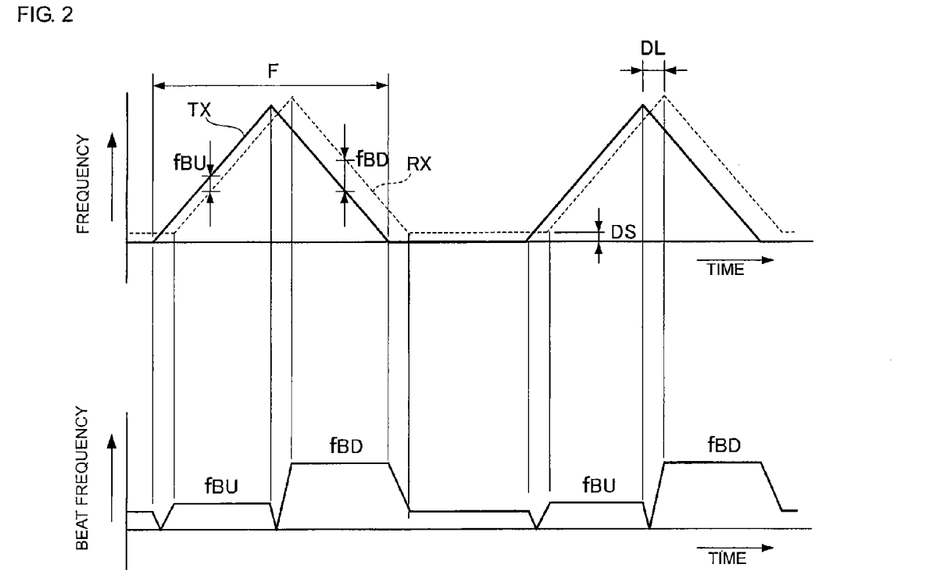
FIG. 2 is a diagram showing an example of changes in frequencies of a reception signal and a transmission signal that change according to a distance to a target from the radar and a relative speed of the target.

FIG. 2 shows examples of a difference of frequency change between a transmission signal and a reception signal resulting from a distance to a target and a relative speed. In a transmission signal TX, a frame F, constituted by an up-modulation interval in which the frequency increases and a down-modulation interval in which the frequency decreases, is repeated. The frequency difference between the transmission signal and the reception signal RX during the period in which the frequency of the transmission signal TX increases is an upbeat frequency fBU. The frequency difference between the transmission signal and the reception signal during the period in which the frequency of the transmission signal decreases is a downbeat frequency fBD. A lag DL on the time axis (time difference) between triangular waves of the transmission signal TX and the reception signal RX corresponds to the time taken for the radio wave to go and return between the antenna and the target. In addition, a difference between the transmission signal and the reception signal on the frequency axis is a Doppler shift amount DS, which is caused by the relative speed of the target with respect to the antenna. The upbeat frequency fBU and the downbeat frequency fBD vary due to the time difference and the Doppler shift amount. Conversely, the distance from the radar to the target and the relative speed of the target with respect to the radar are calculated by detecting this upbeat frequency fBU and the downbeat frequency fBD.

Figure 3:
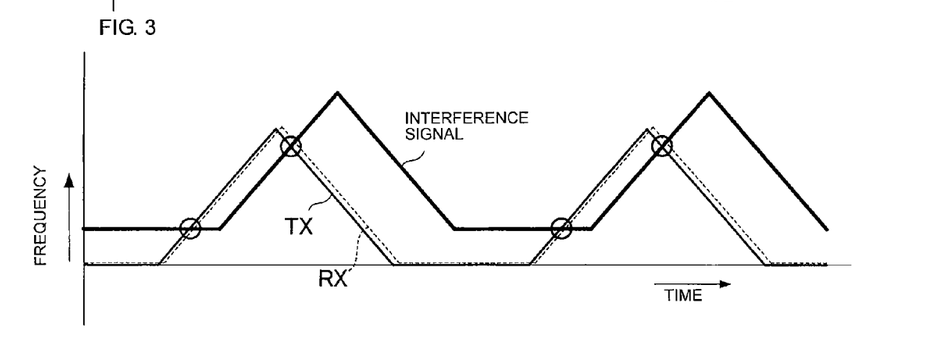
FIG. 3 is a diagram showing an interference signal and an example of timing that spike noises are caused.

FIG. 3 shows the transmission and reception signals, and generation of an interference signal and a spike noise. As already been described using FIGS. 4(A) to 4(C), when an interference signal from another vehicle exists, a spike noise is superposed on a beat signal at timings, indicated by circles in the drawing, that the frequency of the transmission signal TX of the vehicle becomes substantially equal to the frequency of the interference signal. This is because the interference signal from the other vehicle generally significantly deviates from the modulation frequency and the modulation phase of the transmission signal of the vehicle.

Figure 5A:
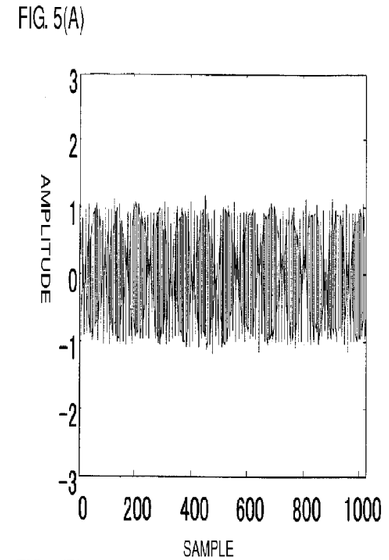
FIGS. 5(A) to 5(D) are diagrams showing examples of spike noises superposed on beat signals and examples of changes in frequency spectra due to the spike noises.
Figure 5B:
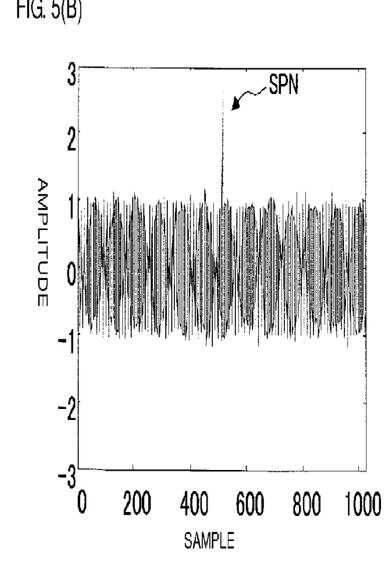

FIGS. 5(A) to 5(D) show examples of spike noises and of changes in frequency spectra according to presence or absence thereof. Both of FIGS. 5(A) and FIG. 5(B) show a time-domain waveform of a beat signal. The horizontal axis represents 1st to 1024th sampling data items clipped in the time domain, whereas the vertical axis represents a signal level (dB). As shown in FIG. 3, when an interference signal does not exist or when frequencies of a transmission signal and an interference signal significantly deviate from one another, a beat signal shown in FIG. 5(A) is obtained. If the frequency difference between the transmission signal and the interference signal is in a frequency band of the intermediate frequency signal, a spike noise SPN is superposed on a beat signal as shown in FIG. 5(B).

Figure 5C:
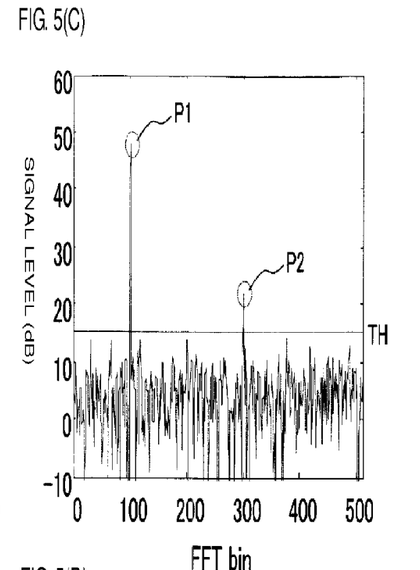
Figure 5D:
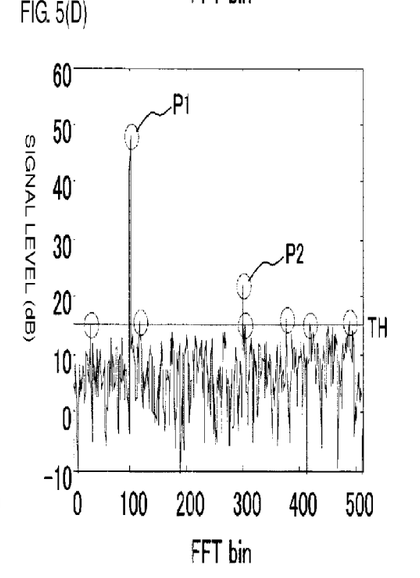

FIG. 5(C) shows a frequency spectrum of the beat signal shown in FIG. 5(A), whereas FIG. 5(D) shows a frequency spectrum of the beat signal shown in FIG. 5(B). In both drawings, the horizontal axis represents a frequency (a frequency bin of FFT), whereas the vertical axis represents normalized power. In a steady state in which the spike noise SPN is not superposed on the beat signal, target peaks P1 and P2 having high peak values appear at a relatively low noise level (background noise) as shown in FIG. 5(C).

On the other hand, if the spike noise SPN is superposed on the beat signal as shown in FIG. 5(B), the noise level generally increases in the frequency spectrum thereof as shown in FIG. 5(D).

Here, a noise threshold TH that exceeds the noise level by a predetermined amount is set. In such a case, when a spike noise is not superposed, peaks P1 and P2 exceeding the noise threshold TH can be extracted as shown in FIG. 5(C). However, if this noise threshold TH is applied to a case where a spike noise is superposed, the number of peaks exceeding the noise threshold TH rapidly increases with a rise of the noise level as shown in FIG. 5(D). The peaks P1 and P2 among those peaks are target peaks, while the others are highly likely to be peaks resulting from noises. These peaks resulting from noises are characterized in that the number thereof is much greater than that of the target peaks. Accordingly, in this first embodiment, a state in which the number of peaks exceeds a predetermined value is considered as a state in which "interference exists", and an appropriate threshold is set so as to be able to extract only target peaks.

Figure 6:
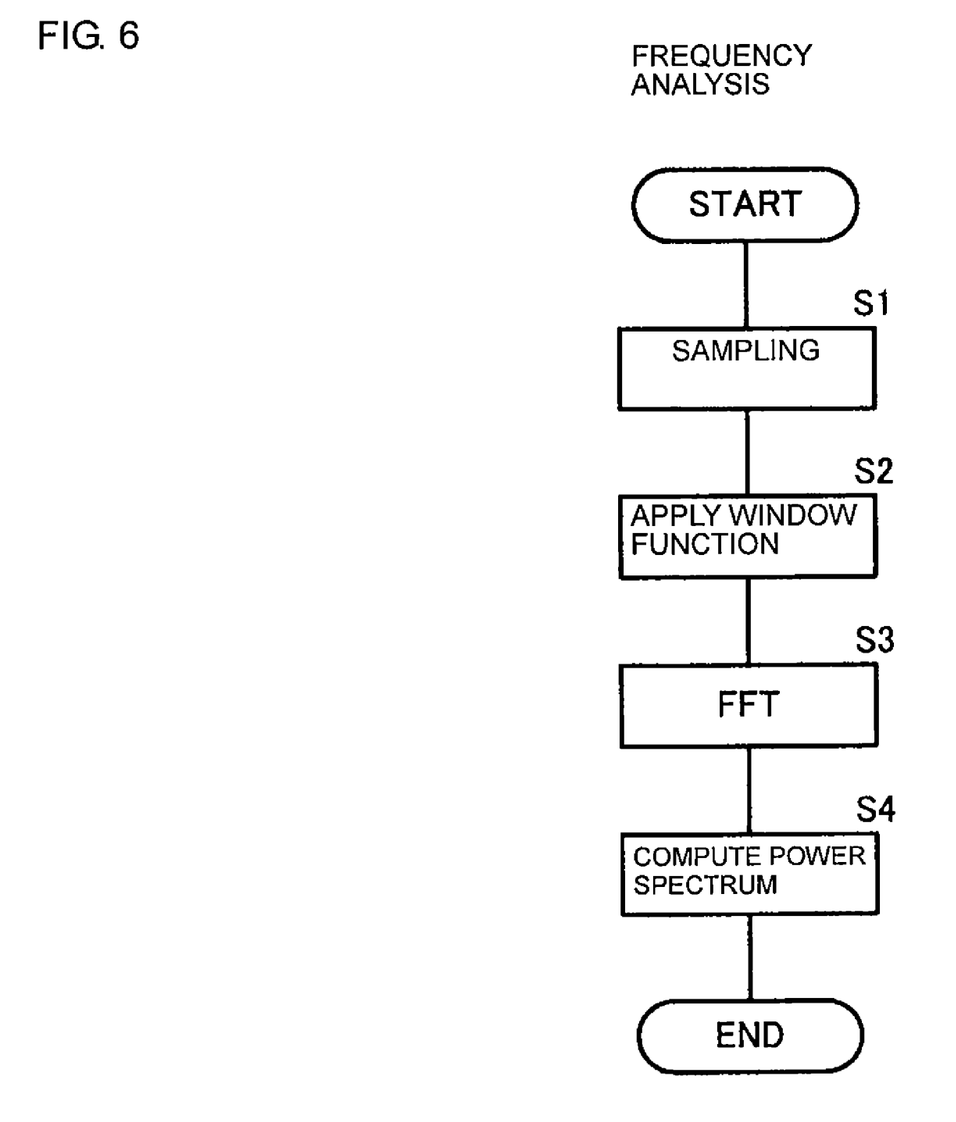
FIG. 6 is a flowchart showing a procedure of frequency analysis in the radar.
Figure 7:
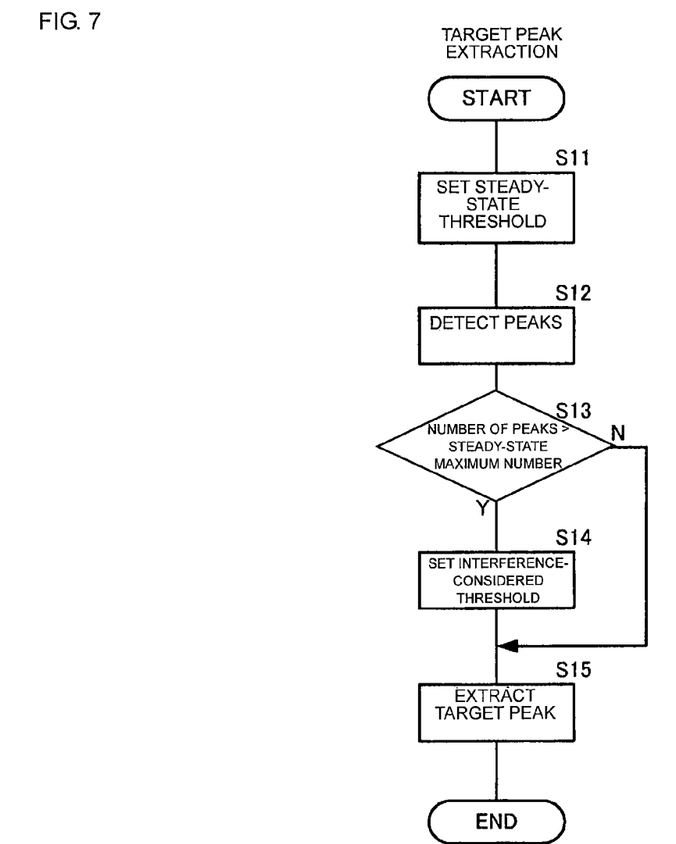
FIG. 7 is a flowchart showing a procedure regarding target peak extraction in the radar.
Figure 8:
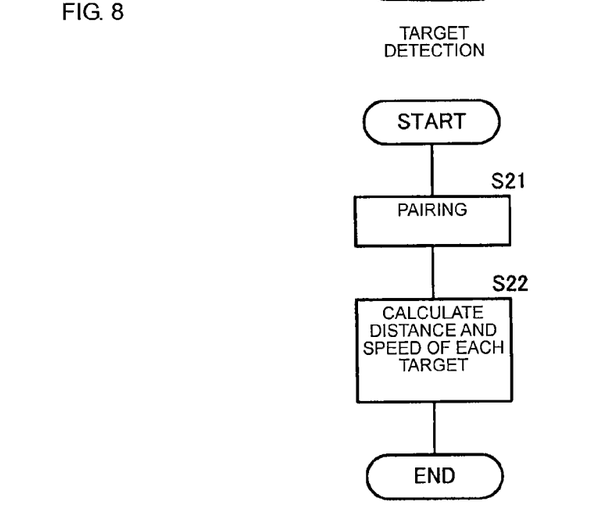
FIG. 8 is a flowchart showing a procedure regarding target detection in the radar.

FIG. 6 to FIG. 8 are diagrams showing contents of processing of the DSP 17 shown in FIG. 1 as flowcharts.

FIG. 6 is a content of processing regarding frequency analysis. Firstly, the DSP 17 samples data items in a processing target range from the digital data sequence converted by the AD converter 8, and applies a window function on the sampled data items (S1→S2). Subsequently, the DSP 17 performs FFT calculation on the predetermined number of data items (S3). Thereafter, the DSP 17 determines a root of a sum of a square of the real part of each determined frequency bin and a square of the imaginary part of the frequency bin to further determine a power spectrum (S4).

FIG. 7 is a flowchart showing a procedure regarding target peak detection. Firstly, the DSP 17 detects peaks exceeding a noise threshold, which is set as a steady-state threshold, from a frequency spectrum (the power spectrum) (S11→S12). Then, the DSP 17 determines whether or not the number of detected peaks exceeds a predetermined value (e.g., 10), which is set as a steady-state maximum number (S13). If the number of detected peaks exceeds the maximum value, the DSP 17 considers the state as the state in which "interference exists", and sets an interference-considered noise threshold (S13→S14). For example, as shown in FIG. 5, the DSP 17 sets a threshold higher than the noise floor level by a predetermined value in order not to mistakenly detect many peaks resulting from noises with the increase in the noise floor level. The DSP 17 then extracts peaks exceeding the noise threshold as target peaks (S15).

If the number of peaks is less than the predetermined value, the DSP 17 extracts peaks exceeding the noise threshold as target peaks without changing the steady-state threshold (S13→S15).

FIG. 8 shows a procedure of target detection processing. Firstly, the DSP 17 performs pairing on the basis of the frequency and the peak value of the target peak extracted regarding the up-modulation interval and the down-modulation interval (S21). Thereafter, the DSP 17 calculates the distance and the speed of each target based on the paired peak value and peak frequency of the peak, and outputs these results (S22).

A radar according to a second embodiment will be described on the basis of FIGS. 9(A) to 9(C) and FIG. 10 next.

When a configuration of the entirety of a radar according to the second embodiment is illustrated as a block diagram, the configuration is similar to that shown in FIG. 1. Thus, FIG. 1 is also referred to in this second embodiment.

Figure 9A:
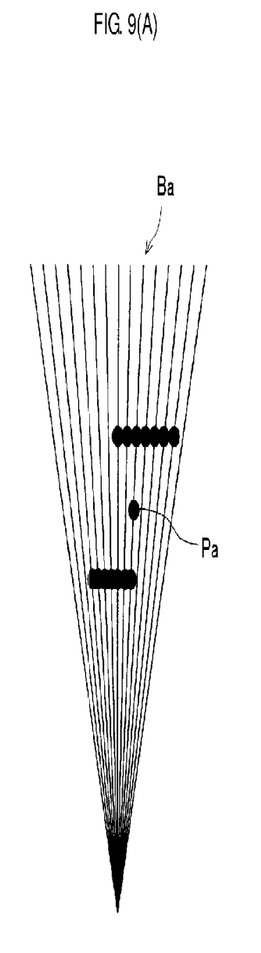
FIGS. 9(A) to 9(C) are diagrams showing each beam and peak positions that appear on frequency spectra determined for each beam as positions in a range direction of the beam using black dots when electromagnetic beams are radiated in an azimuth direction.
Figure 9B:
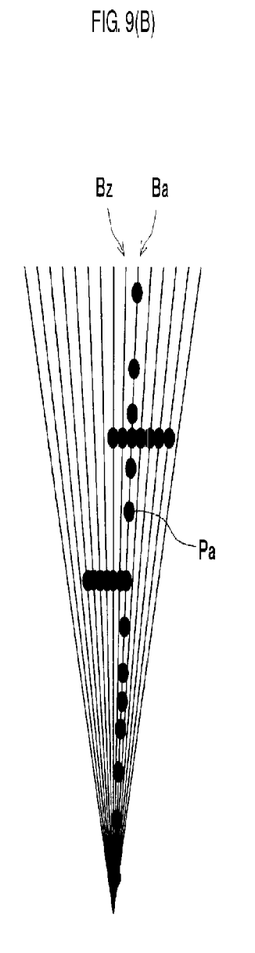
Figure 9C:
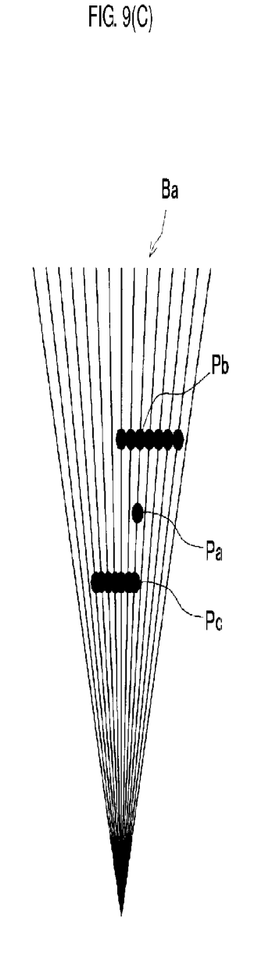

FIGS. 9(A) to 9(C) are diagrams showing each of electromagnetic beams irradiated in the azimuth direction and showing peak positions that appear (are extracted) on a frequency spectrum determined for each beam as positions on a range direction of the beam using black dots. FIG. 9(A) shows peaks detected in a scan, whereas FIG. 9(B) shows peaks detected in the next scan.

Now, a beam Ba of a scan shown in FIG. 9(B) is focused. The number of peaks in a beam Ba of the last scan is "3" as shown in FIG. 9(A). The number of peaks in the beam Ba of this scan is "15". The number of peaks increases by 12 only for a time taken for one scan. This is because interference is caused on the beam Ba at the time of scan shown in FIG. 9(B). Accordingly, when the number of detected peaks increases to exceeds the reference number by a predetermined value, the DSP 17 considers the state as the state in which "interference exists", and sets a noise threshold used by the threshold processing/peak detecting unit 11 to a higher value.

As a result, as shown in FIG. 9(C), peaks of noises due to interference are not mistakenly extracted as target peaks in the beam Ba, original target peaks Pa, Pb, and Pc can be certainly extracted.

In addition, the DSP 17 detects presence or absence of interference by comparing the number of peaks in adjacent beams of this scan in addition to a method for detecting presence or absence of interference on the basis of the number of peaks in the same beam of the last scan. For example, when a beam shown in FIG. 9(B) is radiated from the left to the right in the drawing, the number of peaks in a beam Bz immediately prior to the beam Ba is set as the reference number.

In this case, the number of peaks in the beam Bz is "2" as shown in FIG. 9(B). The number of peaks in the beam Ba of this scan is "15". The number of peaks increases by 13 with a change in the direction for only one beam. This is because interference is caused on the beam Ba. Accordingly, when the number of detected peaks increases to exceed the reference number by a predetermined value, the DSP 17 considers the state as the state in which "interference exists", and sets a noise threshold used by the threshold processing/peak detecting unit 11 to a higher value.

In addition, the DSP 17 compares the number of peaks detected for a temporary neighboring modulation interval (e.g., the last up-modulation interval or the last down-modulation) with the number of peaks in this modulation interval. If the number of peaks increases by a predetermined value, the DSP 17 considers the state as the state in which "interference exists", and sets the noise threshold used by the threshold processing/peak detecting unit 11 to a higher value.

Figure 10:
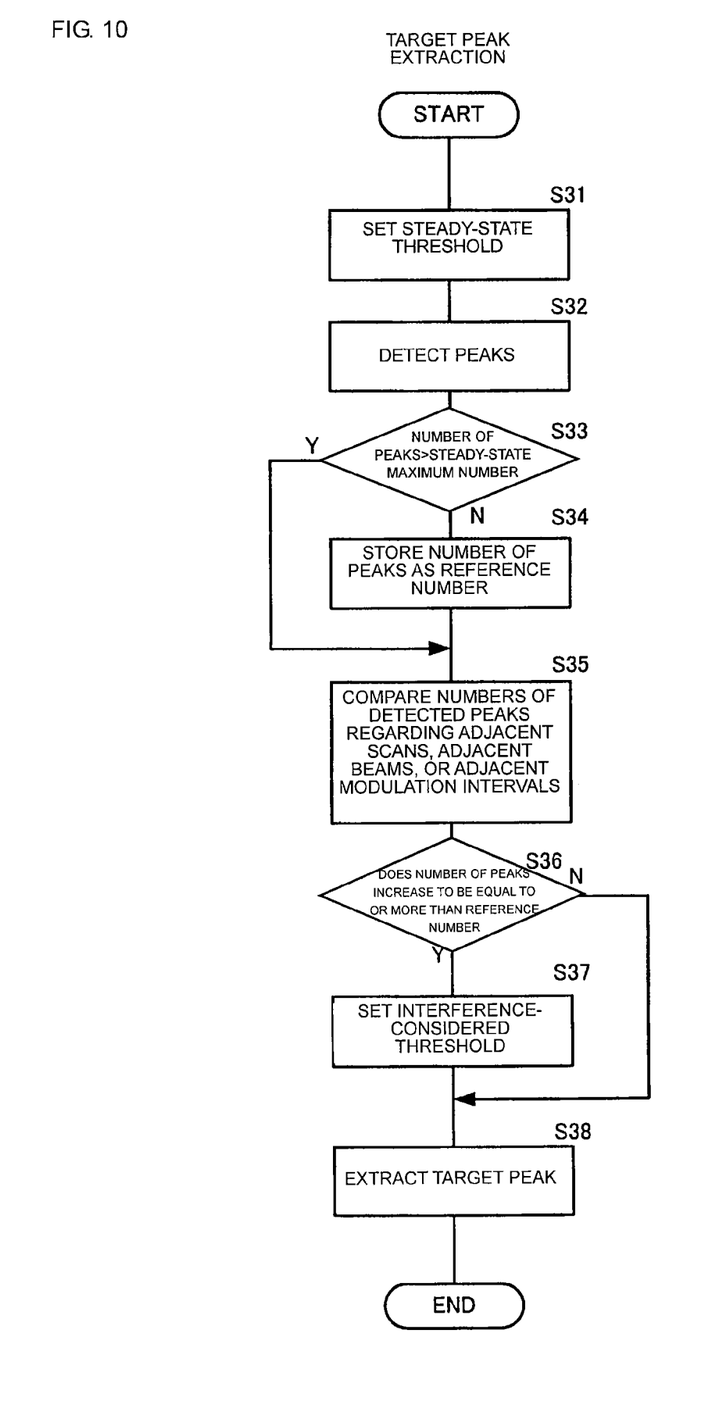
FIG. 10 is a flowchart showing a procedure regarding target peak extraction in a radar according to a second embodiment.

FIG. 10 is a flowchart showing a procedure regarding target peak extraction among contents of processing of a DSP, which corresponds to the DSP 17 shown in FIG. 1.

Firstly, the DSP detects peaks exceeding a noise threshold, which is set as a steady-state threshold, from a frequency spectrum (the power spectrum) (S31→S32). Then, the DSP determines whether or not the number of detected peaks exceeds a value set as a steady-state maximum number (S33).

If the number of peaks does not exceed the steady-state maximum number, the DSP stores the number of peaks as a reference number (the number of peaks in the steady state) (S34).

Thereafter, the DSP compares the number of peaks detected for a beam of a temporary neighboring scan (e.g., the last scan) in the same direction as that of the focused beam with the number of peaks in the focused beam detected in this scan (S35). Alternatively, the DSP compares the number of peaks detected for a neighboring beam (e.g., an adjacent beam in the azimuth direction) with the number of peaks in the focused beam. Alternatively, the DSP compares the number of peaks detected for a temporary neighboring modulation interval (e.g., the last up-modulation interval or the last down-modulation interval) with the number of peaks in this modulation interval.

If the number of peaks increases to exceed the reference number by a predetermined value though this comparison, the DSP considers the state as the state in which "interference exists", and sets the interference-considered noise threshold (S36→S37). For example, as shown in FIG. 5, the DSP sets a noise threshold higher than the noise floor level by a predetermined value in order not to mistakenly detect many peaks resulting from noises with the increase in the noise floor level. The DSP then extracts peaks exceeding the noise threshold as target peaks (S38).

If the number of peaks is less than the predetermined number, the DSP extracts peaks exceeding the noise threshold as target peaks without changing the steady-state threshold (S36→S38).

In addition, an increase or a decrease in the number peaks may be determined according to whether the number of peaks increases by a predetermined ratio or more in addition to the determination of whether or not the number of peaks increases to exceed the comparison target number of peaks by a predetermined amount.

The invention claimed is:

1. A radar comprising:
   a transmitter that transmits a transmission signal whose frequency gradually changes over time within a modulation interval;
   a receiver that receives a reception signal reflected from a target;
   a frequency spectrum unit that obtains a frequency spectrum of a beat signal of the transmission signal and the reception signal;
   a peak detecting unit that detects the presence or absence of interference on the beat signal according to whether or not a number of peaks exceeding a noise threshold exceeds a predetermined number; and
   a signal processing unit that performs processing on the beat signal according to the presence or the absence of the interference.

2. The radar according to claim 1, wherein, if the number of peaks exceeding the noise threshold does not exceed the predetermined number, then the peak detecting unit extracts the peaks exceeding the noise threshold without changing a steady-state threshold.

3. A radar comprising:
   a transmitter that transmits a transmission signal whose frequency gradually changes over time within a modulation interval;
   a receiver that receives a reception signal reflected from a target;
   a frequency spectrum unit that obtains a frequency spectrum of a beat signal of the transmission signal and the reception signal;
   a reference number setting portion that sets a reference number based on a number of peaks exceeding a noise threshold;
   a peak detection unit that detects presence or absence of interference on the beat signal according to whether or not the number of peaks exceeding the noise threshold exceeds the reference number by a predetermined value or a predetermined ratio; and
   a signal processing unit that performs processing on the beat signal according to the presence or the absence of the interference.

4. The radar according to claim 3, wherein the radar repeats scans of the transmission and reception signals in the azimuth direction, and wherein the reference number is set based on the number of peaks, exceeding the noise threshold, determined for a beam in a same direction as a previous scan.

5. The radar according to claim 3, wherein the radar repeats scans of the transmission and reception signals in the azimuth direction, and wherein the reference number is set based on the number of peaks, exceeding the noise threshold, determined for a beam neighboring a focused beam.

6. The radar according to claim 3, wherein the reference number is set based on the number of peaks, exceeding the noise threshold, determined for a neighboring modulation interval.

7. The radar according to claim 3, wherein, if the number of peaks exceeding the noise threshold does not exceed the predetermined value or the predetermined ratio, then the peak detecting unit extracts the peaks exceeding the noise threshold without changing a steady-state threshold.

* * * * *

UNITED STATES PATENT AND TRADEMARK OFFICE
CERTIFICATE OF CORRECTION

| | | |
|---|---|---|
| PATENT NO. | : 8,125,375 B2 | Page 1 of 1 |
| APPLICATION NO. | : 11/934382 | |
| DATED | : February 28, 2012 | |
| INVENTOR(S) | : Motoi Nakanishi | |

It is certified that error appears in the above-identified patent and that said Letters Patent is hereby corrected as shown below:

On the title page, insert the following priority data:

--Related U.S. Application Data (63) Continuation of application No. PCT/JP2006/308201, filed on April 19, 2006.--

Signed and Sealed this
Twelfth Day of February, 2013

Teresa Stanek Rea
*Acting Director of the United States Patent and Trademark Office*